INVENTOR.
CHARLES W. HARTMAN

F̲I̲G̲-4

3,677,890
PLASMA HEATING AND DENSIFICATION IN AXISYMMETRIC TOROIDAL PLASMA CONFINEMENT DEVICES
Charles W. Hartman, Alamo, Calif., assignor to the United States of America as represented by the United States Atomic Energy Commission
Filed Apr. 23, 1971, Ser. No. 136,927
Int. Cl. G21b 1/02
U.S. Cl. 176—5     8 Claims

ABSTRACT OF THE DISCLOSURE

A two-stage process and apparatus for generating and confining a hot, dense plasma for achieving controlled thermonuclear fusion in an axisymmetric toroidal confinement device by first trapping an electron plasma in a closed minimum-|B| magnetic mirror confining field region of the device and raising some to relativistic temperatures by electron-cyclotron resonance microwave heating, and thereafter injecting a cold dense pulse of neutral gaseous thermonuclear fuel into the confining field region for interaction with the hot electrons therein in a collisional heat transfer mode productive of ion heating to multi-kev. temperature with a very high plasma density of the order of $10^{13}$/cm.$^3$ to $10^{14}$/cm.$^3$.

BACKGROUND OF THE INVENTION

The invention disclosed herein was made in the course of or under Contract No. W-7405-ENG-48 with the United States Atomic Energy Commission.

Various axisymmetric toroidal plasma confinement devices, such as, Tokamaks, Levitrons, etc., are presently employed in controlled thermonuclear fusion research in an effort to confine an ionized gaseous plasma of sufficient density and temperature to sustain fusion burning. Heretofore such fusion burn conditions have not been attained because insufficient heating, instabilities and energy loss mechanisms prevent the plasma from reaching the fusion burn threshold. In this regard, present techniques for attempting to generate a hot, dense plasma in toroidal confinement devices involve either direct injection of high energy plasma particles into the confining magnetic fields, or attempting to heat a confined low energy, dense plasma to fusion temperatures by ohmic heating or cyclotron resonance microwave heating. Most direct injection approaches involve the use of plasma guns requiring open magnetic field surfaces in the confinement field which thereby leave particle drift surfaces temporarily open. Also, low frequency or convective disturbances are introduced into the plasma by gun injection techniques. Together, these anomalous effects induce a particle and heat loss rate which prevent the plasma from reaching fusion burn conditions. Confined plasma heating techniques, on the other hand, suffer from diverse limitations which prevent the establishment of fusion burn conditions in toroidal confinement devices. More particularly, for cold, dense, confined plasma, ohmic heating has been the predominant approach. Ohmic heating involves conducting a large current through the cold dense plasma, the current thereby inducing plasma particle collisions which increase the energy or temperature of the plasma. However, as the plasma temperature increases, its conductivity decreases with the result that there is an inherent upper limit on the magnitude of current which can be induced in the confined plasma, and hence an upper limit on the amount of energy which can be transmitted to the plasma by ohmic heating. Cyclotron resonance microwave heating techniques, on the other hand, are density limited. More particularly, plasma density must be low in order for microwave energy to penetrate the plasma and resonantly interact with the individual plasma particles as they spiral around the confining magnetic field lines. Microwaves are reflected from a high density plasma as if it were a conductive metal body at higher densities where the plasma frequency exceeds the microwave frequency.

It will therefore be appreciated that with existing arrangements for heating plasma in toroidal confinement devices, either the plasma density is too low or the plasma temperature is too low to initiate fusion burn. In other words, with such devices it has not been heretofore possible to provide a confined plasma simultaneously having an ion density of the order of $10^{13}$ to $10^{14}$ per cm.$^3$ and ion temperature of the order of tens of kev., commensurate with the fusion burn threshold.

SUMMARY OF THE INVENTION

The present invention relates to an improved two-stage process and apparatus for generating and confining a hot, dense plasma in an axisymmetric toroidal confinement device commensurate with the initiation of a sustained controlled thermonuclear fusion reaction.

It is a principal object of the present invention to provide for improved heating and densification of plasma in toroidal confinement devices including Tokamaks, Levitrons, and Stellarators.

It is another object of the invention to provide a heating process wherein an electron plasma trapped in a closed minimum-|B| magnetic field of a toroidal confinement device is raised to relativistic temperatures as by means of electron cyclotron resonance microwave heating and the resulting energetic electrons serve as a high energy density storage medium for intense heating of dense plasma ions formed upon introduction of a cold dense neutral gas pulse for collisional interaction with the hot electron plasma.

Still another object of the invention is the provision of apparatus for conducting a process of the general class hereinbefore described which may be arranged to yield a novel plasma confining toroidal field configuration having enhanced stability.

It is a further object of the invention to provide apparatus of the class described wherein a reactant plasma is embedded in a hot electron plasma confined in a minimum-|B| magnetic mirror field, the electron plasma carrying a pinch current to provide a resultant reactant plasma confining field of toroidal stabilized-pinch configuration.

DETAILED DESCRIPTION OF THE INVENTION

Figure 1:
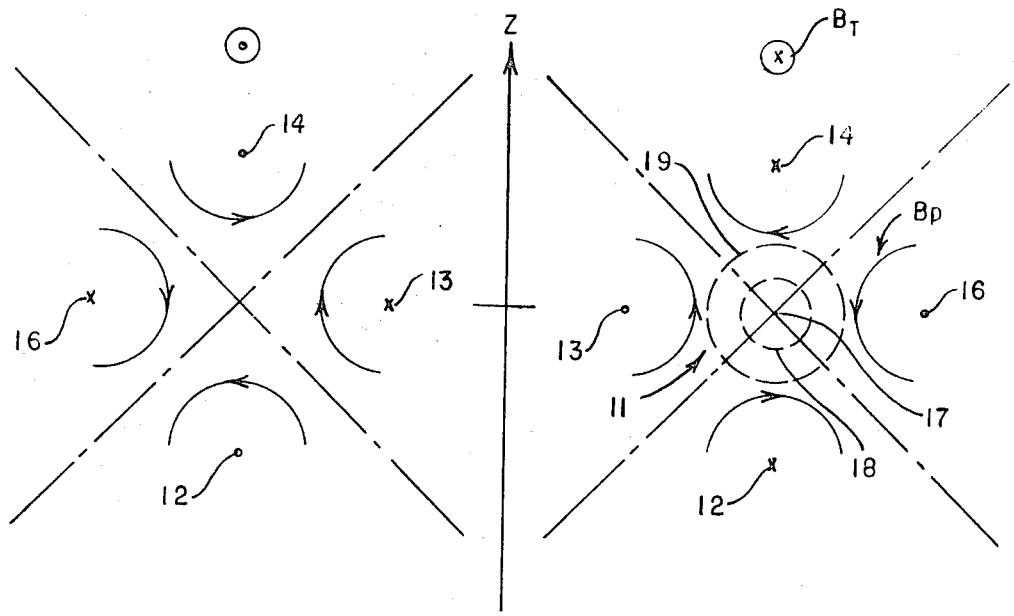
FIG. 1 is a graphical illustration of one form of magnetic confining field with which the process of the present invention may be applied, the field configuration being depicted for the initial stages of the process.

The present invention provides a plasma heating and densification process which is generally applicable to substantially any toroidal plasma confinement device having closed confinement characteristics, such devices including Tokamaks, Levitrons, Stellarators, and the like.

Basically, the process includes trapping a relatively low density electron plasma in mirror regions within a closed toroidal confinement field of a device or in open mirror regions prior to inducing a pinch current, which step may be accomplished in a conventional manner by gun injection of plasma, plasma formation in-situ, or other well known techniques. The trapped plasma is then excited in an electron-cyclotron resonance mode to heat the plasma electrons to relativistic temperatures. In this regard, heating may be accomplished in a well known manner by beaming microwaves at the periphery of the plasma in cyclotron resonance with the plasma electrons. Alternatively, off-resonance microwave heating techniques may be employed to raise the plasma electron temperature to relativistic proportions. In any event a hot electron plasma is established within the confinement field having an electron density of the order of $10^{13}$ per cm.$^3$ or greater, and electron temperatures of the order of hundreds of kev.

With the hot electron plasma thus established, a dense pulse of "cold" gaseous thermonuclear fuel is injected into the closed confinement field for ionizing interaction with the hot electron plasma trapped therein. In the course of such interaction, the hot electron plasma heats the electrons and ions of the injected fuel gas in a collisional heat transfer mode substantially analogous to ohmic heating processes. Intense heating of the plasma ions occurs, and by virtue of the high density of injected fuel gas molecules, the density of the intensely heated ions is likewise high. In this manner, a confined plasma having an ion density of the order of $10^{14}$ per cm.$^3$ and ion temperatures of the order of hundreds of kev. is established commensurate with threshold conditions for sustained fusion burning.

It is to be noted that in instances where the hot electron plasma density is extremely high, e.g., greater than $10^{14}$ per cm.$^3$, the depth of penetration of the cold gas molecules into the plasma body is limited. However, build-up of reactant plasma may be accomplished by the release of energetic Frank-Condon atoms at the plasma surface. Since only a portion of the incident gas molecules will disassociate into atoms under these circumstances, it is necessary that the initial neutral gas density be an order of magnitude greater than that which would otherwise be required. Alternatively, the molecules of the incident gas pulse may be penetrated into the plasma body by temporarily forming an electron free region therein for receiving the injected gas. For example, intercepting baffle surfaces may be introduced to a strong field region of the hot electron plasma confining field and then withdrawn to thereby leave a clear channel into which the neutral gas pulse may be injected before appreciable scattering of the energetic electrons occurs which would prevent penetration of the neutral particles. Another suitable injection technique involves momentarily modifying the shape or intensity of the magnetic confining field in such a manner as to temporarily exclude energetic electrons from a region of the confining volume, and then injecting the neutral gas pulse into such region. In this regard a pair of localized longitudinally juxtaposed magnetic mirror perturbations may be instantaneously superimposed upon the confing field and swept away from each other to exclude electrons from the intervening region therebetween, and subsequent to the injection of the gas pulse to the region, the mirror perturbations may be diminished to zero to permit the energetic electrons to reenter the region.

With regard to the generation of the cold dense pulse of gaseous fuel, this may be accomplished by electrically heating a thin stainless steel tube which has been previously cooled to about 4° K., and on which the required number of deuterium molecules, or the like, are condensed. Upon heating the tube, the condensed molecules are rapidly vaporized with the result that a dense gaseous cloud of fuel material is evolved from the tube. It will be appreciated that such a pulsed gas source may be made axisymmetric so as to evolve an inwardly directed annular cloud of gaseous fuel material about an injection region of the confining field.

Figure 2:
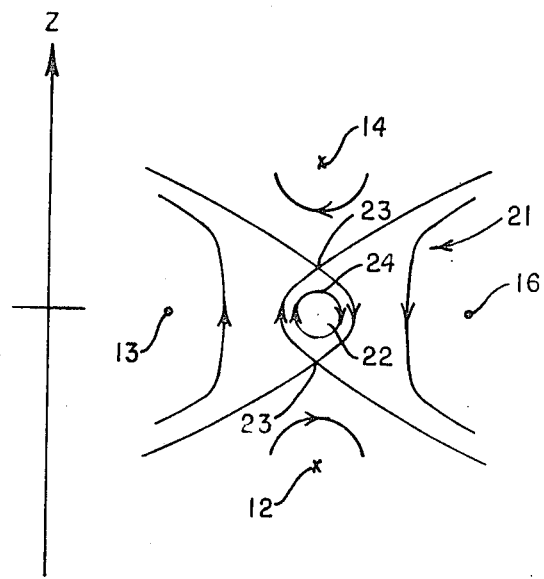
FIG. 2 is a graphical illustration of the confining field depicting a modification of its configuration during subsequent stages of the process.
Figure 3:
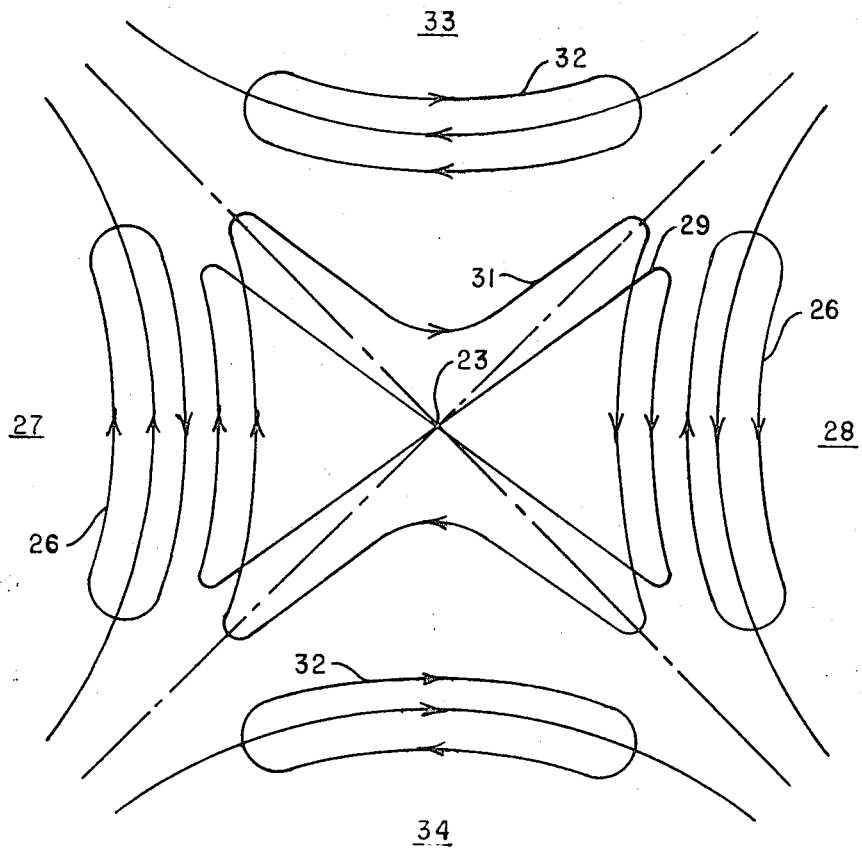
FIG. 3 is a graphical illustration of electron trajectories in a region of the field of FIG. 2.

Considering now the general process of the invention outlined hereinbefore in more detail with reference to a preferred toroidal magnetic confinement configuration, reference is made to FIGS. 1–3, which depict the application of the process to a toroidal stablized pinch poloidal confinement field arrangement. More particularly, a toroidal shaped minimum-|B| magnetic mirror field 11 is provided about an axis of symmetry Z by combination of a poloidal field $B_p$ with a toroidal field $B_T$. In the illustrated case, the poloidal field is of toroidal quadrupole configuration and generated, for example, by a plurality of quadrantial ring currents 12, 13, 14, and 16 coaxially disposed about the Z axis, circumferentially successive ones of the currents being in opposite directions. The toroidal field is generated as by means of a toroidal solenoid symmetrically circumferentially disposed with respect to the ring currents. Symmetrically about the null point 17 of poloidal field $B_p$, a stagnation or null locus 18 occurs with field lines closing in the toroidal direction. In the vicinity of the stagnation locus 18, the flux surfaces of the resultant magnetic field have a minimum average value (minimum-|B|) as indicated at 19. Similar minimum-|B| properties are obtained with higher order multipoles, periodically reversed multipoles (strong focussing fields), or with helical Stellarator windings. Although the null point 17 is present in $B_p$, the total field remains nonzero so that magnetic moment is conserved and mirror confinement of charged particles is obtained.

A low density electron plasma is injected into the thus established toroidal minimum-|B| field 19 and trapped, whereupon the plasma is raised to relativistic temperatures by electron-cyclotron resonance microwave heating techniques as previously described. Now a toroidal stabilized pinch is formed in the vicinity of the toroidal null locus 18 by inducing a voltage therearound. Such voltage may be induced by increasing the flux within the null locus with respect to time. Due to the minimum-|B| properties of the magnetic mirror field and conservation of magnetic moment, the induced voltage causes a large pinch current to flow around the null locus. As a result the confinement field is modified to the configuration depicted in FIG. 2. More particularly, the pinch current generates an axisymmetric magnetic field 21 with closed field lines surrounding the current-carrying region 22. The effect of the induced current is to split the null locus into two component hyperbolic stagnation points, or null loci 23 above and below the midplane, and to replace the midplane hyperbolic point with an elliptical magnetic axis 24 surrounding the current-carrying region 22. The null loci 23 separate axially as the current in region 22 increases. Build-up of such current is provided by the inductive electric field convecting trapped electrons toward the loci 23 in the radial direction. The electrons then make a transition across the loci and drift in the axial direction to enter either the pinch region 22 or the mirror regions above or below the pinch. In this regard, the transition of electrons across the upper locus is depicted in FIG. 3. Electrons on banana-like trajectories 26 in the magnetic mirror fields located in opposed quadrants 27 and 28 laterally outwardly adjacent the upper locus 23 are convected radially towards such locus. The electrons pass through separatrix and hyperbanana orbits 29 and 31 about the locus, and then re-form banana trajectories 32 in either the adjacent upper quadrant 33 or adjacent lower quadrant 34 with equal probability. A magnetic mirror field is located in the upper quadrant 33 while the current-carrying region 22 of the pinch is located in the lower quadrant 34. The electron transitions across the lower locus 23 are similar, with electrons re-forming banana trajectories above such locus in the pinch region and below such locus in a magnetic mirror field region.

Hence, some electrons may enter the pinch region on passing orbits and contribute directly to the pinch current. A larger fraction of electrons which contribute to the pinch current, however, enter the pinch region on trapped orbits, in the manner just described, which are then spilled into passing orbits during the drift towards the pinch axis. Consequently, as an overall result of the inductive electric field, the initial electron pressure distribution is convected into the pinch and the vertically adjacent mirror regions, and passing electrons are betatron accelerated to high energy. The intense pinch current generates a closed toroidal magnetic field within the magnetic mirror field.

Finally, a cold dense pulse of gaseous thermonuclear fuel is injected into the hot electron plasma confining field in the manner previously described whereupon it is raised to extremely high temperatures conducive to sustained thermonuclear fusion by collisional interaction with the energetic electrons trapped in the mirror fields and the energetic toroidal passing electrons. Heating is very intense and multi-kev. ion temperatures are to be expected in times of the order of 10–100 milliseconds. In addition, it is to be noted that charge neutralizing ions resulting from ionizing collisions between the gas and mirror trapped energetic electrons are convected into the pinch region in much the same manner as the electrons. Since the electrons and ions are decoupled because of the extremely high electron temperature, the ions in the pinch region also experience betatron acceleration and further enhance the overall heating of the plasma ions.

It will be appreciated that the stability of the resulting toroidal stabilized pinch plasma configuration is substantially better than that which exists with previous plasma confinement arrangements. More specifically, the toroidal plasma is embedded in a hot electron plasma which in turn is confined in a minimum-$|B|$ magnetic mirror field. Accordingly, current-driven instability modes are appreciably damped, increasing stability limits. Moreover, the resulting toroidal field configuration is a toroidal stabilized-pinch field, and therefore has high magnetic shear properties.

Figure 4:
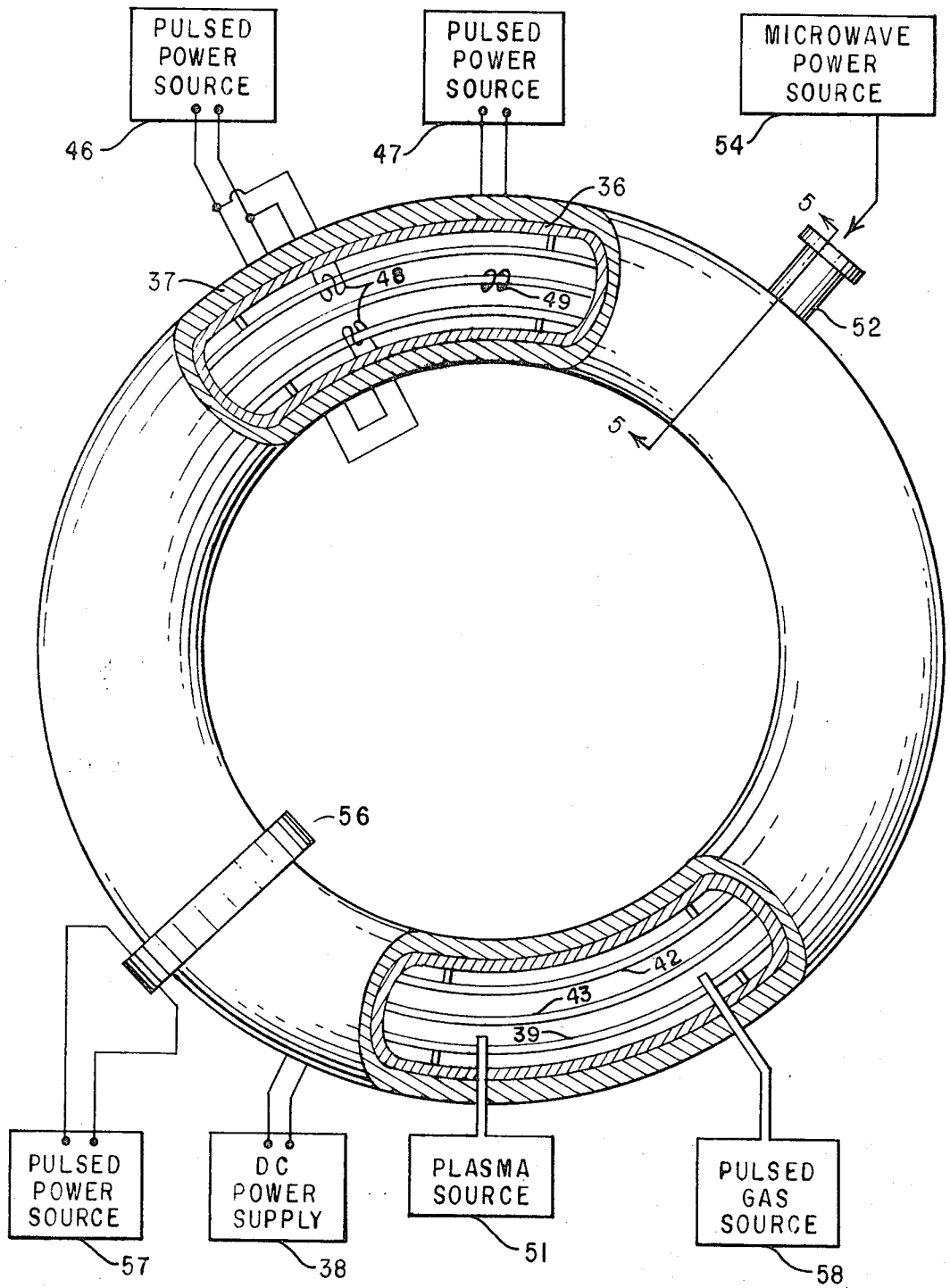
FIG. 4 is a plan view with portions broken-away and partially in schematic of apparatus for conducting a process in accordance with the invention.
Figure 5:
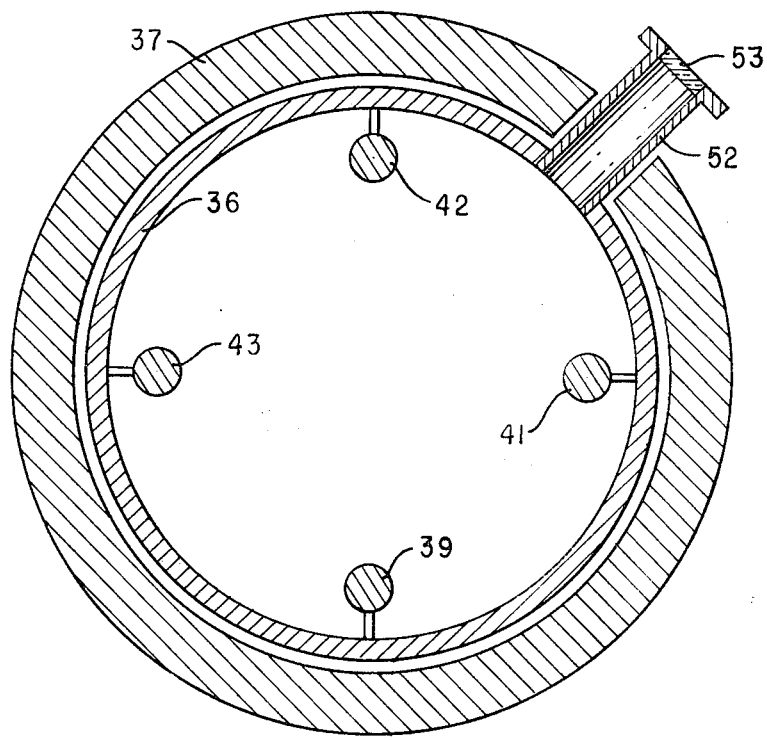
FIG. 5 is a sectional view taken at line 5—5 of FIG. 4.

The process of the present invention described hereinbefore may be advantageously conducted in apparatus of the character illustrated in FIGS. 4 and 5. Such apparatus includes a toroidal shell vacuum vessel 36 which is evacuated to appropriate high vacuum dimensions by conventional pumping means (not shown). A toroidal solenoid 37 is concentrically disposed about the exterior of the vessel and energized by a DC power supply 38 to thereby establish the toroidal magnetic field $B_T$ of previous mention, coaxially of the vessel interior. A plurality of circumferentially spaced hoop conductors 39, 41, 42, and 43 are disposed within the vacuum vessel adjacent its interior wall at quadrantial positions. Such conductors may be mounted as by means of insulated support posts 44 projecting radially inward from the vessel wall. Current is made to flow axially through diametrically opposed conductors 39 and 42 in one direction, and to flow through diametrically opposed conductors 41 and 43 in the opposite direction. The current flows may be established inductively, and in this regard the hoop conductors are preferably superconducting and inductively coupled to pulsed power sources 46 and 47. More particularly, induction coils 48 are concentrically disposed about conductors 39 and 42 and coupled to the output of pulsed power source 46. Similarly, induction coils 49 are concentrically disposed above conductors 41 and 43 and coupled to the output of power source 47. The polarities of sources 46 and 47 and winding sense of coils 48 and 49 are such as to induce currents in conductors 39 and 42 and conductors 41 and 43 in mutually opposite directions. Once the currents are initially established they persist for an extended period of time because of the superconducting nature of the conductors. Thus, the previously mentioned ring currents 12, 13, 14, and 16 are established in hoop conductors 39, 41, 42, and 43 and generate the poloidal field $B_p$ within the vessel 36 which interacts with the toroidal field $B_T$ to produce the toroidal shaped minimum-$|B|$ magnetic mirror field 11 therein.

Communicating with the interior of vacuum vessel 36 there is provided a plasma source, as schematically depicted at 51, arranged to inject a relatively low density plasma to the magnetic mirror field 11 for trapping therein. Source 51 may include, for example, a circumferential array of conventional button type plasma guns, or the like, positioned to appropriately direct plasma to the field in a well known manner which results in trapping of the plasma. The vacuum vessel 36 is further provided with at least one inlet port 52 having a microwave window 53 at its end for the transmission of microwaves from a microwave power source 54, such as a klystron, to the plasma trapped within the mirror field 11. The source is tuned for electron cyclotron resonance near the flux density of the minimum-$|B|$ portion of the field to thereby heat the plasma electrons to relativistic temperatures and establish a hot electron plasma trapped within the mirror field.

The apparatus of the invention also includes means for inducing a volatage axially of the vessel 36, which means preferably comprise a magnetic core 56 transversely concentrically disposed about the vessel and inductively coupled to a pulsed power source 57. Subsequent to establishment of the hot electron plasma by electron cyclotron resonance microwave heating, the source 57 is pulsed to induce a pinch current of relativistic electrons axially of the vessel which is effective to establish a toroidal stabilized pinch magnetic confining field therein in the manner previously set forth with regard to the process of the invention.

A pulsed gas source 58 is communicated with the interior of vacuum vessel 36 to inject a cold dense pulse of gaseous thermonuclear fuel to the magnetically confined hot electron plasma for collisional interaction with the energetic electrons thereof. As noted previously the gas source may comprise a stainless steel tube pre-cooled to cryogenic temperatures and having a predetermined large number of gaseous fuel molecules condensed thereon, and means for selectively resistively heating the tube to vaporize the condensed molecules and thereby evolve a dense pulse of cold gas. The cold gas molecules undergo collisional interaction with the energetic electrons of the hot electron plasma to produce a dense hot ion plasma commensurate with fusion burn conditions in the manner hereinbefore described.

As one specific example of numerous sets of parameters that may be advantageously employed in the process and apparatus of the invention hereinbefore described, the toroidal vacuum vessel 36 has a major diameter of 500 cm., and a cross-sectional diameter of 100 cm., and is evacuated to a base pressure of the order of $0.3-1 \times 10^{-8}$ torr. The power supply 38 and solenoid 37 are designed to generate a toroidal magnetic field $B_T$ having a flux density of the order of 20 kg. The hoop coductors 39, 41, 42 and 43 are of a material such as niobium tin ($Nb_3Sn$), and the pulsed power sources 46 and 47 are capacitor banks arranged to induce ring currents in the hoop conductors having magnitudes of the order of 1000 ka., productive of a poloidal field $B_p$ with flux density of the order of 20 kg. The fields $B_T$ and $B_p$ interact to provide minimum-$|B|$ of the order of 20 kg. A low density and temperature plasma is injected from plasma source 51 and trapped in the field. Microwave power source 54 is operated at 55 gHz. to produce hot electron plasma with density of the order of several $\times 10^{13}$ cm.$^{-3}$ and electron temperature of the order of 0.5–1 mev. The core 56 and pulsed power source 57 are designed to induce a pinch current of the order of $5.9 \times 10^6$ A. through the hot electron plasma. The pulsed gas source 58 is arrange to evolve a gas pulse of at least $10^{14}$ molecules per cm.$^3$ at a temperature of the order of 10° K. The resulting plasma has an ion temperature of the order of 10–50 kev. and a density of the order of $10^{14}$ per cm.$^3$.

Although the invention has been hereinbefore described and illustrated in the accompanying drawings with respect to preferred embodiments, it will be appreciated that various modifications and changes may be made therein without departing from the true spirit and scope of the invention, and thus it is not intended to limit the invention except by the terms of the appended claims.

What I claim is:

1. A plasma heating and densification process comprising generating in an evacuated region a toroidal magnetic confinement field having closed minimum-|B| characteristics, trapping a relatively low density plasma in magnetic mirror regions within said confiement field and heating the electrons of said plasma to relativistic temperatures to thereby establish a hot electron plasma within said confinement field, generating a toroidal stabilized pinch current of relativistic electrons axially of said hot electron plasma within said confinement field to thereby generate a closed toroidal stabilized pinch magnetic field within said mirror regions, and introducing a dense pulse of cold gaseous thermonuclear fuel to said confinement field for ionizing interaction with said hot electron plasma confined therein with the energetic electrons of the hot electron plasma trapped within said mirror regions and electrons of said pinch current heating the electrons and ions of said gaseous fuel in a collisional heat transfer mode productive of a resultant plasma having high ion density and temperature.

2. A process according to claim 1, further defined by said heating the electrons of said plasma to relativistic temperatures comprising exciting said plasma with microwave energy in cyclotron resonance with the plasma electrons.

3. A process according to claim 1, further defined by the generating of a toroidal magnetic confinement field having closed minimum-|B| characteristics including generating and combining a toroidal field and a poloidal field to produce a resultant magnetic mirror field having a stagnation locus symmetrically about the null point of the poloidal field with minimum-|B| flux surfaces in the vicinity of said stagnation locus.

4. A process according to claim 3, wherein said heating the electrons of said plasma to relativistic temperatures comprises exciting said plasma with microwave energy in cyclotron resonance with the plasma electrons, and said pinch current is generated by inducing a voltage around said stagnation locus to transfer relativistic electrons from the hot electron plasma into confined toroidal passing trajectories and thereby adiabatically generate said toroidal stabilized pinch current.

5. Plasma heating and densification apparatus comprising an evacuated toroidal vacuum vessel, means for generating within said vessel a toroidal minimum-|B| magnetic mirror field having an axisymmetric stagnation locus capable of trapping an electron plasma, electron plasma generating means communicating with the interior of said vessel to inject electron plasma to said mirror field for trapping therein, microwave power source means transmissively coupled to the interior of said vessel for directing microwave energy to electron plasma trapped in said mirror field to heat the electrons thereof to relativistic temperatures, means for inducing a voltage toroidally around said stagnation locus to generate a relativistic electron pinch current flow therearound with said current flow thereby generating a toroidal magnetic field within said mirror field, and pulsed gas source means communicating with the interior of said vessel for introducing a cold dense pulse of gaseous thermonuclear fuel to said mirror field and closed toroidal field for collisional interaction with said electron plasma, whereby said fuel is ionized and heated by the relativistic electrons of said electron plasma to establish a reactant plasma having high ion density and temperature.

6. Apparatus according to claim 5, further defined by said means for generating a toroidal minimum-|B| mirror field comprising a toroidal solenoid concentrically disposed about the exterior of said vacuum vessel and energized with direct current to generate a toroidal magnetic field coaxially of the vessel, a first pair of diametrically opposed hoop conductors disposed within said vessel adjacent the interior wall thereof, a second pair of diametrically opposed hoop conductors disposed within said vessel adjacent the interior wall thereof at positions circumferentially spaced 90° from said first pair of conductors, and means for effecting current flow through said first pair of conductors and said second pair of conductors respectively in opposite directions to thereby generate a toroidal quadrupole magnetic field through said vessel for interaction with said toroidal field to establish said minimum-|B| mirror field having an axisymmetric stagnation locus.

7. Apparatus according to claim 6, further defined by said means for inducing a voltage toroidally around said stagnation locus comprising a magnetic core transversely concentrically disposed about said vessel and inductively coupled to a pulsed power source.

8. Apparatus according to claim 7, further defined by said microwave power source means comprising at least one inlet port in said vessel having a microwave window therein, and a microwave power source directing microwaves through each window and tuned for electron cyclotron resonance near the flux density of the minimum-|B| portion of said mirror field.

References Cited

UNITED STATES PATENTS

| | | | |
|---|---|---|---|
| 3,527,977 | 9/1970 | Ruark | 176—5 |
| 3,218,235 | 11/1965 | Ehler | 176—1 |

CARL D. QUARFORTH, Primary Examiner

H. E. BEHREND, Assistant Examiner

U.S.Cl. X.R.

176—1